United States Patent Office 3,705,126
Patented Dec. 5, 1972

3,705,126
STABILIZATION OF SYNTHETIC POLYMERS
Katsuaki Matsui, Tomoyuki Kurumada, Ichiro Watanabe, Noriyuki Ohta, Keisuke Murayama, and Syoji Morimura, Tokyo, Japan, assignors to Sankyo Company Limited
No Drawing. Filed June 10, 1970, Ser. No. 45,258
Claims priority, application Japan, June 20, 1969, 44/48,745
Int. Cl. C08f 45/60; C08g 51/60
U.S. Cl. 260—45.8 N       7 Claims

ABSTRACT OF THE DISCLOSURE

Synthetic polymers are stabilized against photo- and thermo-deterioration thereof by having incorporated therein a piperidine-4-spiro-hydantoin derivative in a sufficient amount to prevent such deterioration, said polymers including polyolefins, polyvinyl chlorides, polyvinylidene chlorides, polyamides and polyurethanes.

---

This invention relates to the stabilization of synthetic polymers. More particularly, it is concerned with the stabilization of synthetic polymers against photo- and thermo-deterioration thereof by having incorporated therein, in a sufficient amount to prevent such deterioration, a piperidine-4-spiro-hydantoin derivative having the formula

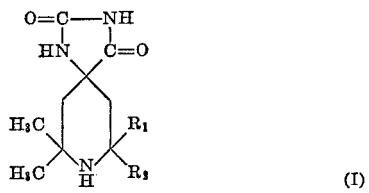

or a salt thereof.

In the above Formula I, $R_1$ and $R_2$ may be the same or different and each represents an alkyl group having 1 to 6 carbon atoms; or they may form, together with the carbon atom to which they are attached, a saturated alicyclic group having 5 or 6 ring carbon atoms or a group of the formula

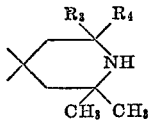

wherein $R_3$ and $R_4$ may be the same or different and each represents an alkyl group having 1 to 6 carbon atoms.

In the definitions of the above Formula I, each of the $R_1$ and $R_2$ may be illustratively exemplified by methyl, ethyl, n-propyl, isopropyl, n-butyl, isobutyl, tert.butyl, n-pentyl, n-hexyl and the like. The groups formed by linkage of the $R_1$ and $R_2$ together with the carbon atom to which they are attached may be illustratively exemplified by the following:

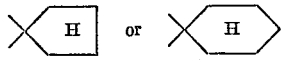

Each of the $R_3$ and $R_4$ may also be illustrated by the same groups as those listed above with respect to each of the $R_1$ and $R_2$.

The term "synthetic polymer" as used herein is intended to embrace polyolefins including homopolymers of olefins such as low-density polyethylene, high-density polyethylene, polypropylene, polystyrene, polybutadiene, polyisoprene and the like, and copolymers of olefins with other ethylenically unsaturated monomers such as ethylene-propylene copolymer, ethylene-butene copolymer, ethylene-vinyl acetate copolymer, styrene-butadiene copolymer, acrylonitrile-styrene-butadiene copolymer and the like;
polyvinyl chlorides and polyvinylidene chlorides including homopolymer of each of vinyl chloride and vinylidene chloride, vinyl chloride-vinylidene chloride copolymer and copolymers of each of vinyl chloride and vinylidene chloride with vinyl acetate or other ethylenically unsaturated monomers;
polyamides; and
polyurethanes.

The polyvinyl chlorides and polyvinylidene chlorides may also be blended with other synthetic polymers to form the compositions.

These synthetic polymers have been extensively used in the art, in view of their excellent properties, in various forms or shapes, for example, filament, fibre, yarn, film, sheet, other molded article, latex and foam. However, these polymers have some drawbacks such as poor light- and heat-stabilities. Illustratively, polyolefins and polyurethane elastomers tend to undergo severe deterioration when exposed to light such as sunlight or ultraviolet ray, and polyvinyl chloride and polyvinylidene chloride frequently tend to deteriorate and become colored by the action of light and heat with elimination of hydrogen chloride therefrom. Polyamides also are often subjected to photo-deterioration. For the purpose of stabilizing these synthetic polymers against such deterioration, heretofore have been proposed in the art a number of stabilizers; for example, for polyolefins, benzotriazole compounds and benzophenone compounds; for polyurethanes, phenol compounds and benzophenone compounds; and for polyvinyl chloride and polyvinylidene chloride, lead salts such as basic lead silicate and tribasic lead maleate, and organo-tin compounds such as dibutyltin laurate and di-butyltin maleate. These prior art stabilizers are, however, not satisfactory.

Then, the development of the more effective stabilizers would be desired in the art.

As a result of our extensive studies, it has now been unexpectedly found that the piperidine-4-spiro-hydantoin derivatives (I) and salts thereof of the present invention exhibit a high degree of stabilizing action on the synthetic polymer, e.g. polyolefins, polyvinyl chloride, polyvinylidene chloride, polyamides and polyurethanes, especially polyamides against the deteriorations thereof without any thermal sublimation of the stabilizer and coloring action on the polymer.

It is, accordingly, a primary object of this invention to provide the synthetic polymers stabilized against photo- and thermo-deterioration thereof by having incorporated therein at least one of the piperidine-4-spiro-hydantoin derivatives of the above Formula I in a sufficient amount to prevent such deterioration.

Other objects of this invention will be apparent to those skilled in the art from the following detailed description of this invention.

The piperidine-4-spiro-hydantoin derivatives (I) which may be employed as a useful stabilizer in this invention are new substances, except for the compound of the above Formula I wherein both $R_1$ and $R_2$ are methyl: that is, 1,3,8-triaza - 7,7,9,9 - tetramethyl - 2,4 - dioxo-spiro[4.5] decane is disclosed in the Bulletin de la Société chimique de France, 1967, No. 3,815. Such new compounds may be readily prepared, for example, by reacting a piperidine derivative having the formula

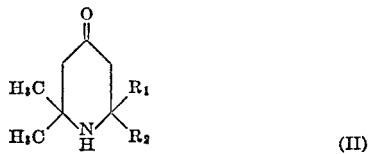

(II)

wherein $R_1$ and $R_2$ are as defined above with ammonium carbonate and an alkali metal cyanide, e.g. sodium or potassium cyanide.

Representative examples of the piperidine-4-spiro-hydantoin derivatives (I) employed in this invention are listed hereinbelow. It is, however, to be understood that the present invention is not limited to those illustrated compounds.

(1) 1,3,9-triaza-7,7,9,9-tetramethyl-2,4-dioxo-spiro[4.5]decane;
(2) 1,3,8-triaza-7,9,9-trimethyl-7-n-hexyl-2,4-dioxo-spiro[4.5]decane;
(3) 1,3,8-triaza-7,9,9-trimethyl-7-isobutyl-2,4-dioxo-spiro[4.5]decane;
(4) 1,3,8-triaza-7,7-di-isobutyl-9,9-dimethyl-2,4-dioxo-spiro[4.5]decane;
(5) cyclopentane-1-spiro-2'-(6',6'-dimethylpiperidine)-4'-spiro-5''-hydantoin;
(6) cyclohexane-1-spiro-2'-(6',6'-dimethylpiperidine)-4'-spiro-5''-hydantoin; and
(7) (2,2,6,6-tetramethylpiperidine)-4-spiro-2'-(6',6'-dimethylpiperidine)-4'-spiro-5''-hydantoin.

As explained hereinabove, the salts of the piperidine derivatives (I) are also contemplated to be included within the purview of the present invention. Examples of the salts of the piperidine-4-spiro-hydantoin derivatives (I) which may be employed in the present invention include inorganic acid salts such as phosphate and the like; as well as organic acid salts such as citrate, stearate, benzoate, and the like.

The piperidine-4-spiro-hydantoin derivatives (I) or salts thereof employed as stabilizers in the present invention may be readily incorporated into the synthetic polymers by various standard procedures commonly utilized in the art. The stabilizers may be incorporated into the synthetic polymers at any desired stage prior to the manufacture of shaped articles therefrom. Thus, for example, the stabilizer in the form of a powder may be mixed with the synthetic polymer, or a suspension or emulsion of the stabilizer may be mixed with a suspension or emulsion of the synthetic polymer.

The amount of the piperidine-4-spiro-hydantoin derivatives (I) or salts thereof employed in the synthetic polymer in accordance with the present invention may vary widely depending upon the type, properties and particular uses of the synthetic polymer to be stabilized. In general, the piperidine-4-spiro-hydantoin derivatives of the Formula I or salts thereof may be added in an amount ranging from 0.01 to 5.0% by weight, based on the amount of the synthetic polymer, but the practical range is varied depending upon the type of the synthetic polymer, that is 0.01 to 2.0% by weight, preferably 0.02 to 1.0% by weight for polyolefins, 0.01 to 1.0% by weight, preferably 0.02 to 0.5% by weight for polyvinyl chloride and polyvinylidene chloride, and 0.01 to 5.0% by weight, preferably 0.02 to 2.0% by weight for polyurethanes and polyamides.

The present stabilizers may be used alone or in combination with other known stabilizers, fillers, pigments and the like.

If desired, two or more of the present stabilizers i.e. the piperidine-4-spiro-hydantoin derivatives of the Formula I and salts thereof may also be satisfactorily used in admixture.

The preparations of some of the new piperidine-4-spiro-hydantoin derivatives which may be employed in this invention will be illustratively exemplified below.

PREPARATION 1

Cyclohexane-1-spiro-2'-(6,6'-dimethylpiperidine)-4'-spiro-5''-hydantoin

To a solution of 10 g. of 1-aza-2,2-dimethyl-4-oxospiro[5.5]undecane is 200 ml. of 50% ethanol were added 19 g. of ammonium carbonate and 3.2 g. of sodium cyanide. The resulting mixture was heated with stirring at 55–60° C. for 7 hours. After cooling, the crystalline substance which precipitated was recovered by filtration, washed with water and the washed precipitate was then dissolved in an 10% aqueous sodium hydroxide solution. The resulting solution was neutralized with dilute hydrochloric acid, the crystalline substance which precipitated was recovered by filtration, washed with water and then recrystallized from dilute ethanol to give 14.6 g. of the desired product as white crystals melting at 280.5–282° C.

Analysis.—Calcd. for $C_{14}H_{23}N_3O_2$ (percent): C, 63.37; H, 8.74; N, 15.84. Found (percent C, 63.20; H, 8.81; N, 15.82.

PREPARATION 2

(2,2,6,6-tetramethylpiperidine)-4-spiro-2'-(6',6'-dimethylpiperidine)-4'-spiro-5''-hydantoin To a solution of 5 g. of 1.9-diaza-2,2,8,8,10,10-hexamethyl-4-oxo-spiro[5.5]undecane is 60 ml. of 50% ethanol were added 6.5 g. of ammonium carbonate and 1.1 g. of sodium cyanide. The resulting mixture was heated with stirring at 55–60° C. for 8 hours. After cooling, the crystalline substance which precipitated was recovered by filtration, washed with water and the washed precipitate was dissolved in an 10% aqueous sodium hydroxide solution. The resulting solution was neutralized with dilute hydrochloric acid, the crystalline substance which precipitated was recovered by filtration, washed with water and then recrystallized from 30% ethanol to give 5.1 g. of the desired product as white crystals melting at 243° C. (with decomposition).

Analysis.—Calcd. for $C_{17}H_{30}N_4O_3$ (percent): C, 63.32; H, 9.38; N, 17.38. Found (percent): C, 63.38; H, 9.42; N, 17.33.

In order that this invention may be better understood the following examples are given by way of illustration only. In these examples, all parts are given by weight unless otherwise indicated.

EXAMPLE 1

Into 100 parts of polyvinyl chloride ("Geon 103 EP," trade name, available from The Japanese Geon Co. Ltd., Japan) were incorporated 1.0 part of lead stearate, 0.5 part of dibasic lead phosphite, 0.5 part of barium stearate, 0.5 part of cadmium stearate and 0.2 part of each test compound of this invention indicated below. The resulting mixture was blended and kneaded for 4 minutes on a kneading roll at 180° C. and formed into a sheet having a thickness of about 0.5 mm. The sheet was tested for the discoloration degree thereof by the aging test method set forth below.

Aging test (1) Outdoor exposing for a period of 1 year and 3 months. The results are given in the following Table 1.

(2) The sheet was aged for 90 minutes at 170° C. in a Geer's aging tester prescribed in Japanese Industrial Standard JIS–K–6301 entitled "Physical Testing Methods for Vulcanized Rubber," paragraph 6.5 (in English). The results are given in the following Table 2.

TABLE 1

| Test Compound No.* | Coloration |
|---|---|
| 1 | Colorless. |
| 6 | Do. |
| 7 | Do. |
| None | Brown |

*The number of the test compound is the same as specified hereinabove.

TABLE 2

| Test Compound No.* | Coloration |
|---|---|
| 1 | Pale yellow. |
| 6 | Do. |
| 7 | Yellow. |
| None | Black. |

*Same as above, Table 1.

EXAMPLE 2

Into 100 parts of polypropylene ("Noblen JH H–G," trade name, available from Mitsui Toatsu Chemicals Inc., Japan, employed after two extractions with monochlorobenzene) was incorporated 0.25 part of each test compound of this invention indicated below. The resulting mixture was mixed and melted and then molded into a sheet having a thickness of 0.5 mm. under heating and pressure.

As a control, the polypropylene sheet was prepared in a similar manner to that described above without any of stabilizers for comparative purpose.

Then, all of these sheets thus formed were tested for the brittleness time (which means the time, expressed in terms of hour, until the test sheet will become brittle) under ultraviolet irradiation at a temperature of 45° C. by means of the fade meter prescribed in Japanese Industrial Standard JIS–1044 entitled "Testing Method of Color Fastness to Light of Dyed Textiles and Dyestuffs," paragraph 3.8 (in English).

The results are given in the following Table 3.

TABLE 3

| Test Compound No.* | Brittleness time (hours) |
|---|---|
| 1 | 360 |
| 6 | 420 |
| 7 | 600 |
| None | 60 |

*Same as above, Table 1.

EXAMPLE 3

Into 100 parts of 6-nylon ("CM 1011," trade name, available from Toyo Rayon Co. Ltd., Japan, containing no stabilizer) was incorporated 0.25 part of each test compound of this invention indicated below. The resulting mixture was heated and melted and then molded into a film having a thickness of about 0.1 mm. under pressure. The film thus formed was aged under the following aging condition and thereafter subjected to a tensile test to determine the retentions of ultimate tensile strength and ultimate elongtaion.

Aging test (1) Exposure to ultraviolet ray for 300 hours in the fade meter described above at 45° C. The results are given in the following Table 4.

(2) Aging at 160° C. for 2 hours in a Geer's aging tester. The results are given in the following Table 5.

TABLE 4

| Test compound No.* | Percent | |
|---|---|---|
| | Retention of ultimate elongation | Retention of ultimate tensile strength |
| 1 | 73 | 98 |
| 6 | 75 | 95 |
| 7 | 72 | 90 |
| None | 7 | 74 |

* The number of the test compound is the same as specified hereinabove.

TABLE 5

| Test compound No.* | Percent | |
|---|---|---|
| | Retention of ultimate elongation | Retention of ultimate tensile strength |
| 1 | 73 | 72 |
| 6 | 74 | 69 |
| 7 | 77 | 66 |
| None | 14 | 52 |

* The number of the test compound is the same as specified hereinabove.

EXAMPLE 4

Into 100 parts of polyurethane prepared from polycaprolactone ("E–5080," trade name, available from The Nippon Elastollan Industries Ltd., Japan) was incorporated 0.5 part of each test compound of this invention indicated below. The resulting mixture was heated and melted and then molded into a sheet having a thickness of about 0.5 mm. The sheet thus formed was subjected to the exposure to ultraviolet ray for 15 hours in the fademeter as specified in the above Example 2 at 45° C. and then tested for the retentions of ultimate elongation and ultimate tensile strength as in the above Example 3.

The results are given in the following Table 6.

TABLE 6

| Test compound No.* | Percent | |
|---|---|---|
| | Retention of ultimate elongation | Retention of ultimate tensile strength |
| 1 | 89 | 68 |
| 2 | 90 | 70 |
| 4 | 85 | 65 |
| 5 | 88 | 71 |
| 6 | 87 | 81 |
| 7 | 94 | 83 |
| None | 72 | 37 |

* The number of the test compound is the same as specified above.

From the above results it is apparent that the piperidine - 4 - spiro-hydantoin derivatives of this invention show a highly excellent stabilizing effect on various synthetic polymers, especially polyamides, against deteriorations by light and heat.

EXAMPLE 5

Into 100 parts of polypropylene ("Noblen JH H-G," trade name, available from Mitsui Toatsu Chemicals Inc., Japan) employed after two extractions with monochlorobenzene were incorporated the combination in the indicated compounding ratio of the test compound of this invention with the known stabilizer or only the known stabilizer as shown in the following Table 7. The resulting mixture was made into a sheet in the same manner as in the above Example 2. Then, the sheets thus formed were tested for the brittleness time in the same manner as in the above Example 2.

The results are given in the Table 7.

| Combination of test stabilizers* | Compounding ratio (parts) | Brittleness time (hours) |
|---|---|---|
| 1 | 0.25 | |
| BHT[1] | 0.2 | 540 |
| DLTDP[2] | 0.2 | |
| 1 | 0.1 | |
| Tinuvin P[3] | 0.1 | 860 |
| 1 | 0.1 | 900 |
| | | 900 |
| Cyasorb UV-531[4] | 0.1 | |
| 1 | 0.1 | 1,250 |
| Tinuvin 327[5] | 0.1 | |
| Tinuvin P[6] | 0.1 | 120 |
| Cyasorb UV-531[6] | 0.1 | 280 |
| Tinuvin 327[6] | 0.1 | 200 |
| None | 0 | 60 |

[1] 2,6-di-tert.butyl-p-cresol.
[2] Dilauryl thiodipropionate.
[3] 2-(2'-hydroxy-5'-methylphenyl) benzotriazole, trade name, available from J. R. Geigy A.G.
[4] 2-hydroxy-4-n-octyloxybenzophenone, trade name, available from American Cyanamid Co.
[5] 2-(2'-hydroxy-3',5'-di-tert. butylphenyl)-5-chlorobenzotriazole, trade name, available for J. R. Geigy A.G.
[6] Control.

\* In the column of the stabilizers, the number means that of the compound of this invention specified hereinabove.

From the above results it can be seen that the piperidine - 4 - spiro - hydantoin derivatives of this invention show a high degree of synergistic stabilizing effect on synthetic polymers against deteriorations.

What is claimed is:

1. A synthetic polymer composition stabilized against photo- and thermo-deterioration thereof, said polymer being selected from the group consisting of polyvinyl chlorides, polyvinylidene chlorides, polyamides having recurring amide groups as integral parts of the main polymer chain, and polyurethanes, wherein there is incorporated, in a sufficient amount to prevent said deterioration, a compound having the formula

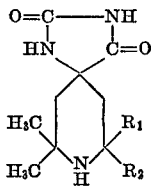

wherein $R_1$ and $R_2$ may be the same or different and each represents an alkyl group of 1 to 6 carbon atoms; or they may form, together with the carbon atom to which they are attached, a saturated alicyclic group of 5 or 6 ring carbon atoms or a group of the formula

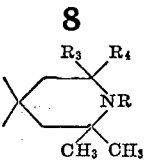

wherein $R_3$ and $R_4$ may be the same or different and each represents an alkyl group of 1 to 6 carbon atoms; or an inorganic or organic acid salt thereof.

2. The synthetic polymer composition according to claim 1 wherein said compound is selected from the group consisting of 1,3,8-triaza-7,7,9,9-tetramethyl-2,4-dioxo-spiro[4.5]decane;
1,3,8-triaza-7,9,9-trimethyl-7-n-hexyl-2,4-dioxo-spiro[4.5]decane;
1,3,8-triaza-7,9,9-trimethyl-7-isobutyl-2,4-dioxo-spiro[4.5]decane;
1,3,8-triaza-7,7-di-isobutyl-9,9-dimethyl-2,4-dioxo-spiro[4.5]decane;
cyclopentane-1-spiro-2'-(6',6'-dimethylpiperidine)-4'-spiro-5''-hydantoin;
cyclohexane-1-spiro-2'-(6',6'-dimethylpiperidine)-4'-spiro-5''-hydantoin; and
(2,2,6,6-tetramethylpiperidine)-4-spiro-2'-(6',6'-dimethylpiperidine)-4'-spiro-5''-hydantoin.

3. The synthetic polymer composition according to claim 1 wherein said compound is incorporated therein in an amount of 0.01–5.0% by weight based upon the synthetic polymer.

4. The synthetic polymer composition according to claim 1 wherein said polymer is a polyvinyl chloride.

5. The synthetic polymer composition according to claim 1 wherein said polymer is a polyamide having recurring amide groups as integral parts of the main polymer chain.

6. The synthetic polymer composition according to claim 1 wherein said polymer is 6-nylon and said compound is 1,3,8 - triaza - 7,7,9,9 - tetramethyl - 2,4 - dioxospiro[4.5]decane.

7. A synthetic polymer composition as claimed in claim 1, wherein said salt is selected from the group consisting of phosphate, citrate, stearate and benzoate.

References Cited
UNITED STATES PATENTS 3,474,068  10/1969  Murayama et al. ____ 260—54.8
3,547,874  12/1970  Murayama et al. ____ 260—45.8
3,542,729  11/1970  Murayama et al. ____ 260—45.8
3,394,102   7/1968  Wakasa et al. _____ 260—45.8

DONALD E. CZAJA, Primary Examiner

R. A. WHITE, Assistant Examiner